Figure 4:
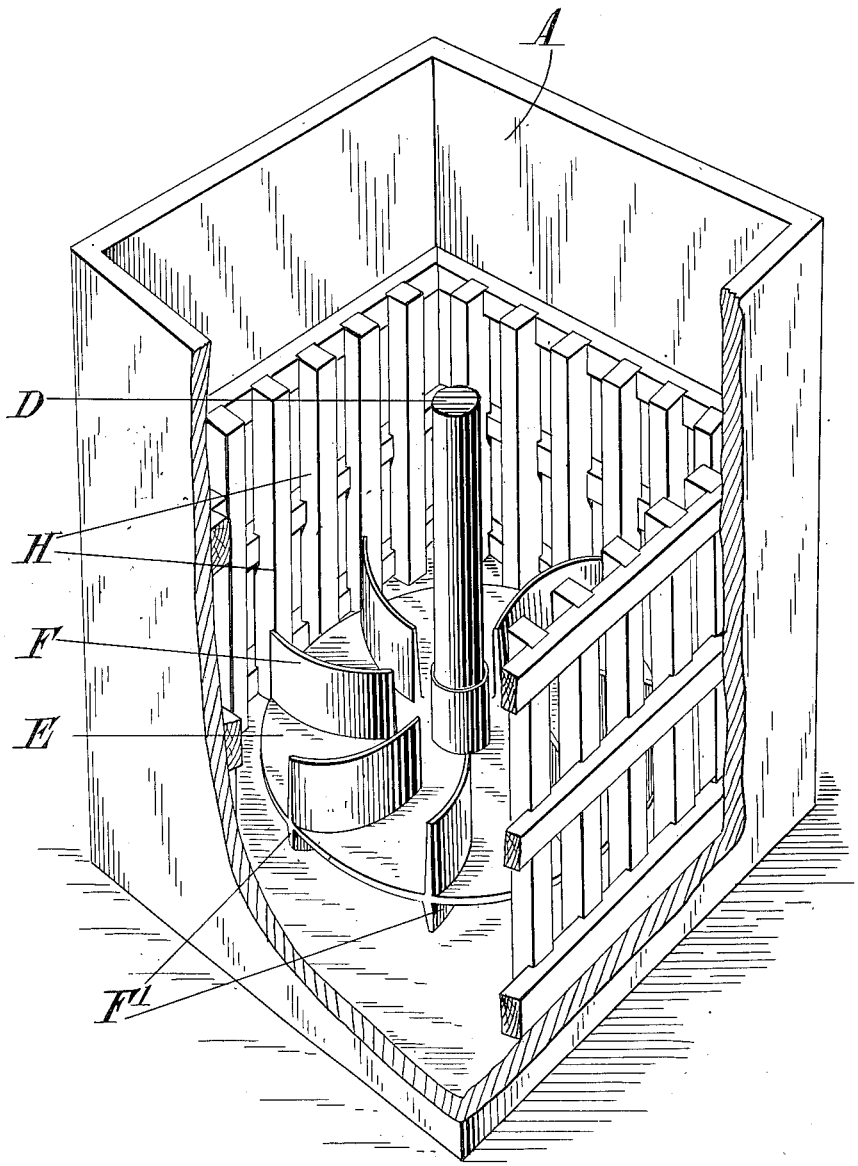

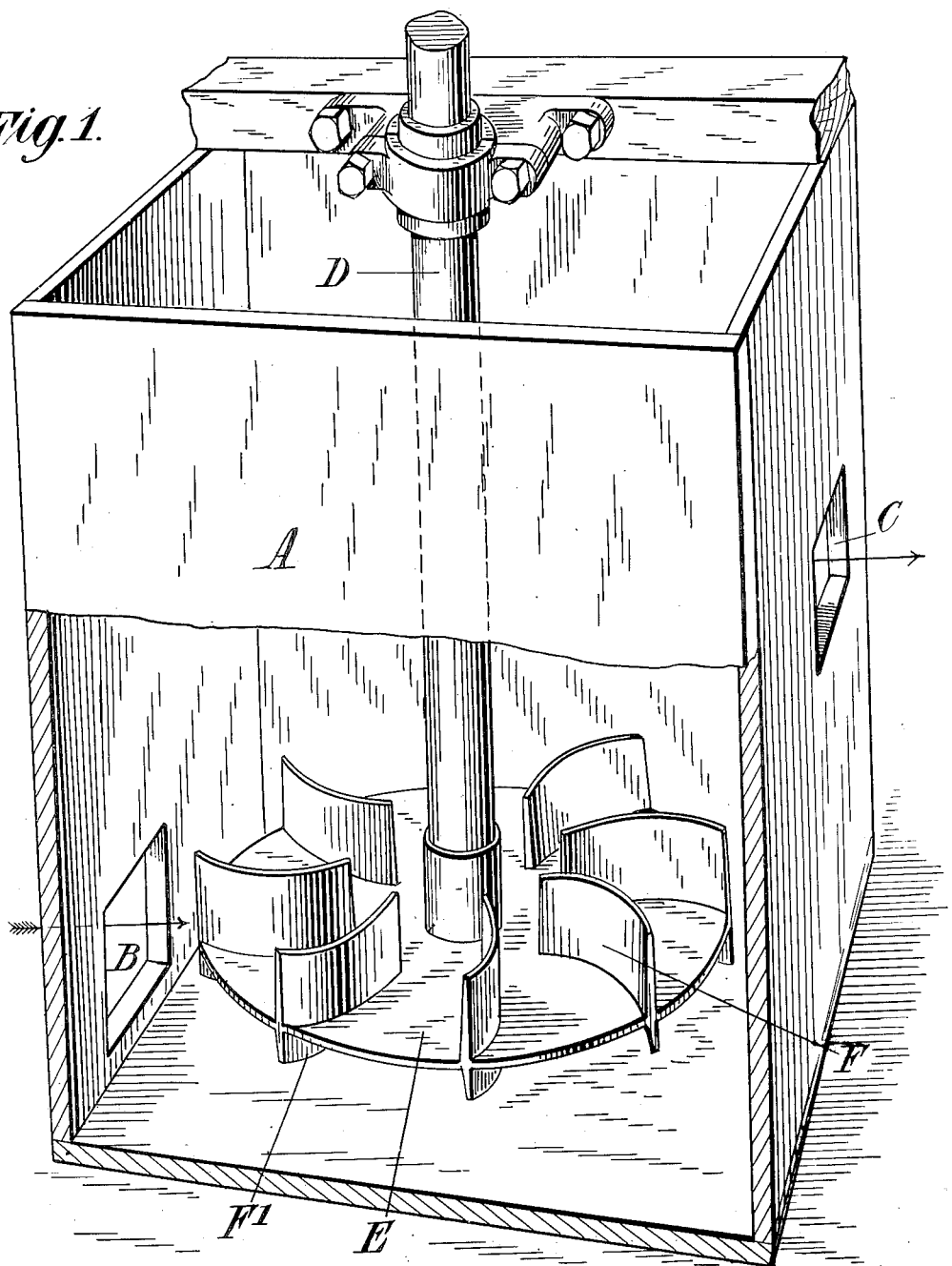

A. C. HOWARD.
APPARATUS FOR AGITATING AND AERATING LIQUIDS OR PULPS.
APPLICATION FILED NOV. 19, 1912.
1,084,210.
Patented Jan. 13, 1914.
4 SHEETS—SHEET 2.
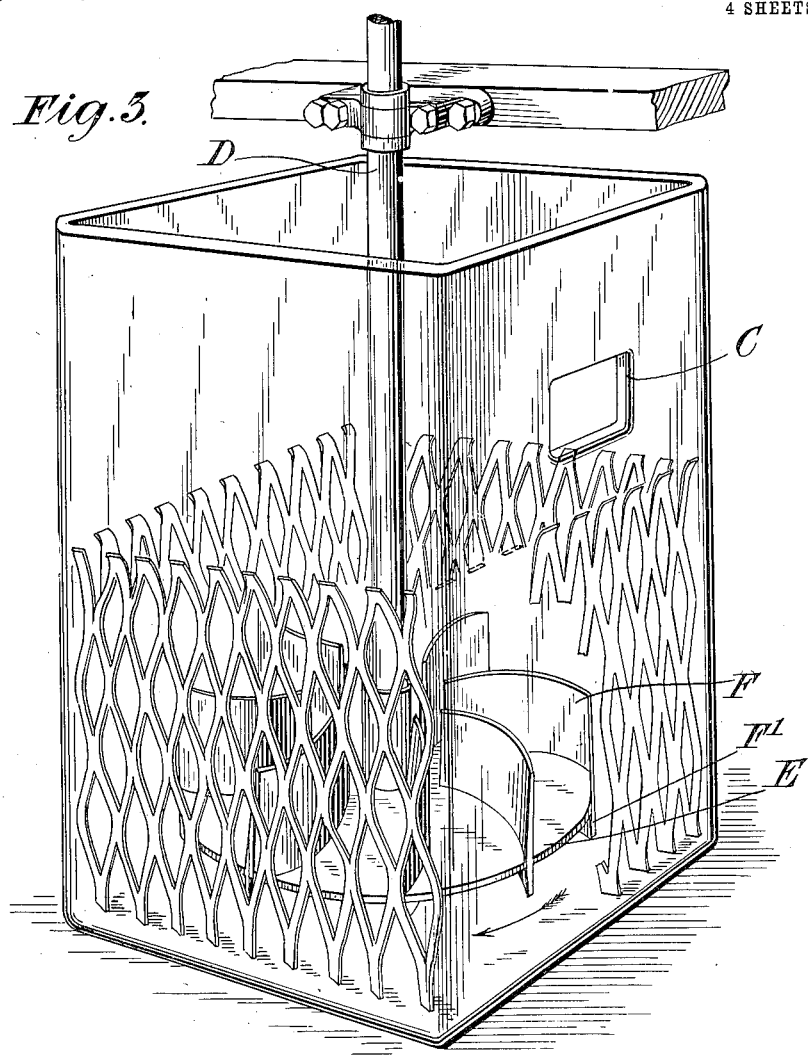
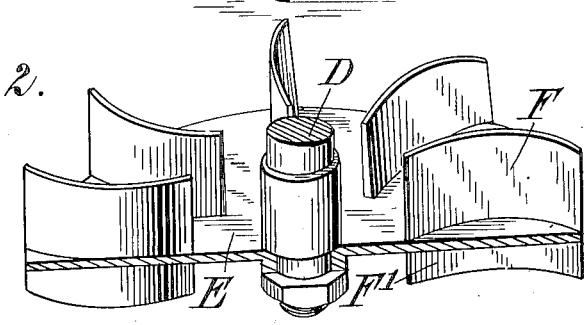

A. C. HOWARD.
APPARATUS FOR AGITATING AND AERATING LIQUIDS OR PULPS.
APPLICATION FILED NOV. 19, 1912.

1,084,210.

Patented Jan. 13, 1914.

A. C. HOWARD.
APPARATUS FOR AGITATING AND AERATING LIQUIDS OR PULPS.
APPLICATION FILED NOV. 19, 1912.

1,084,210.

Patented Jan. 13, 1914.

4 SHEETS—SHEET 4.

Witnesses:

Inventor:
Allen Crawford Howard
by Henry D. Williams
Attorney.

UNITED STATES PATENT OFFICE.

ALLEN CRAWFORD HOWARD, OF LONDON, ENGLAND, ASSIGNOR TO MINERALS SEPARATION LIMITED, OF LONDON, ENGLAND.

APPARATUS FOR AGITATING AND AERATING LIQUIDS OR PULPS.

1,084,210.  Specification of Letters Patent.  Patented Jan. 13, 1914.

Application filed November 19, 1912. Serial No. 732,286.

*To all whom it may concern:*

Be it known that I, ALLEN CRAWFORD HOWARD, a subject of the King of England, residing at London, England, have invented certain new and useful Improvements in Apparatus for Agitating and Aerating Liquids or Pulps, of which the following is a specification.

This invention is for improvements in or relating to apparatus for agitating and aerating liquids or pulps. In this specification the term "agitating" is used to include such operations as disseminating uniformly and efficiently through a bulk of liquid any other substance, gaseous, liquid or powdered solid in any proportions. It also includes such turbulent mixing as is necessary where different materials have to be brought into intimate contact with one another. The term "aerating" is used to include the introduction of any gas into a liquid, whether the gas be soluble or not, and the dissemination of the gas in a state of fine division in the liquid. It also includes the emulsification of a gas in a liquid and in this specification particularly signifies the introduction into a liquid of the supernatant gas such as air. The expression "liquid" is used to include pure liquids such as water, or solutions, or mixtures of liquids, or mixtures of liquids and powdered solids such as mineral pulps.

The invention has arisen in connection with the well-known agitation froth process for concentrating ores by flotation as described for example in the United States Patents Nos. 835120 and 962678, but apparatus embodying the invention can be utilized in any other industrial process in which agitation and aeration are involved.

An apparatus for agitating and aerating liquids or pulps according to this invention comprises the combination with a vessel having flat sides or more or less vertical baffles and an agitator rotated about a vertical axis and comprising a number of vertical blades (substantially radial) curved horizontally and a circular horizontal plate beneath the blades or intercepting them, the agitator being preferably rotated with the concave side of the blades foremost whereby the liquid between the blades is ejected horizontally with such force and produces such a degree of convection that the gas above the liquid is effectively drawn into the liquid and disseminated throughout it in a finely divided state. In the agitator employed, it is preferable according to this invention that the curved radial blades do not extend inward to the axis, either above or below the horizontal plate or both.

According to a further feature of this invention the apparatus for agitating and aerating liquids or pulps comprises the combination with a centrifugal agitator of a multiplicity of more or less vertical baffles consisting of expanded metal, lattice work, grid or grating, so placed that flat faces thereof intercept or obstruct the rotary movement of the liquid, the baffles being disposed around the agitator or extending upward to a greater or less extent. These baffles are preferably in contact with the walls of the containing vessel and constitute reentrant angles.

In the agitation-froth process of concentrating ores referred to above it is at present the practice to agitate and aerate the pulp mixture in one vessel and thereafter to run it out into another vessel such as a spitzkasten where (owing to the comparatively quiescent state of the liquid) the froth forms and is then separated by overflow.

In certain cases it may be desirable to provide for the formation of froth in the same vessel in which the agitation and aeration takes place and this invention affords means for effecting this.

In the application of this invention to the agitation-froth process of concentrating ores, a feature of this invention consists in a method of agitating the pulp by producing a powerful convection within the pulp without subjecting the whole surface of the pulp to turbulence whereby the pulp may be efficiently agitated and aerated, while at the same time a portion of the surface of the pulp is sufficiently quiescent to allow of the formation and removal of mineral-bearing froth.

Figure 5:
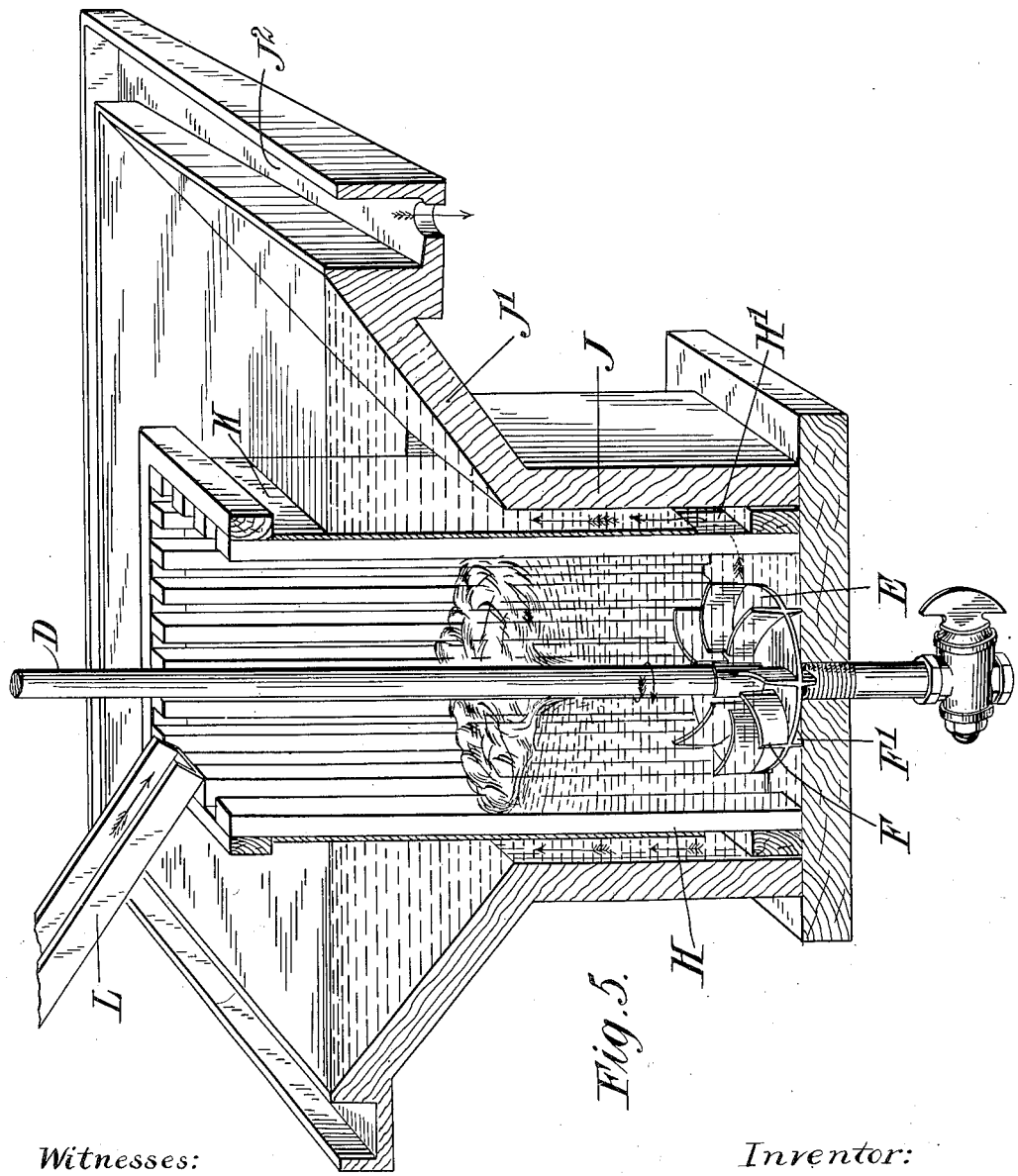

In the accompanying drawings which illustrate by way of example forms of apparatus embodying this invention and designed to carry out the agitation froth process of concentrating ores, Figure 1 is a perspective view of a single unit of the agitating apparatus only with one wall partly broken away. Fig. 2 is a perspective view in section of the agitator. Fig. 3 is a perspective view of a modified form of the apparatus partly broken away, the outer vessel being shown of glass to render the internal construction visible. Fig. 4 is a perspective view of a modified form of apparatus partly broken away. Fig. 5 is a perspective view in section of a modified form of the apparatus.

Referring to Fig. 1 the agitation and aeration vessel consists of a rectangular box A conveniently of wood with an inlet B and an outlet C suitably arranged. It is adapted to be used with one or more spitzkastens as in the construction shown in the patent to Hebbard, No. 1,064,209, or the patents to Hoover, Nos. 953,746 and 979,857. The agitation and aeration vessel is provided with an agitator rotated by a vertical spindle D the agitator being immersed in the liquid. The agitator itself comprises a flat horizontal plate E mounted on the spindle D. Above this plate are a number of (say eight) substantially radial vertical blades F horizontally curved. These blades may be provided also beneath the horizontal plate as at F'. The blades are short arcs. They do not extend inward to the spindle D. The function of the blades is to throw the liquid between them violently outward in a horizontal direction thus creating a very powerful convection combined of course with rotary motion.

Referring to Fig. 3, the outer vessel A and the agitator D, E. F, F' may be constructed and arranged as above described. Within the vessel A surrounding the agitator, and preferably in contact with the walls of the vessel, is placed a strip of expanded metal or lattice work G so placed that flat faces thereof intercept or obstruct the rotary movement of the liquid. This expanded metal or the like G may be furnished only in a belt surrounding the agitator E, F, F', or it may extend upward and downward as much as is necessary to give the most efficient result.

Referring to Fig. 4, the vessel A, and agitator D, E, F, F' may be constructed and arranged as above described. Within the vessel A and preferably close to the walls of the vessel is arranged a grid or grating H so placed that flat faces thereof intercept or obstruct the rotary movement of the liquid.

When the agitator is rotated it is found that the liquid between the blades is thrown out horizontally with such force as to create a very powerful convection combined with rotary motion around the vertical axis. Whenever the streams of liquid are obstructed as by a flat side of the vessel or by a baffle therein, eddies are set up, introducing into the liquid bubbies of air, which are immediately sucked downward by the convection action, thrown violently out by the centrifugal action and to a greater or less extent drawn around by the rotary motion of the liquid. Wherever streams of bubbles meet obstructions such as flat sides of the vessel or more or less vertical baffles they are broken up and tend to be emulsified in the water. One function of the horizontal plate E is to intercept the downflowing water, to retain it within the sphere of action of the blades F and thus to increase the positive action of said blades. The blades F' below the horizontal plate act to throw out the pulp below the plate E thereby preventing quiescence there and promoting the total centrifugal or pumping effect of the agitator.

Referring to Fig. 5 the agitator D, E, F, F' is constructed as before and rotates in the center of an outer vessel J which is enlarged at the top in the form of an inverted cone J' surrounded by a launder $J^2$. Between the outer vessel J and the agitator is placed a grating H which is open near the bottom thus forming orifices H'. The upper part of the grating is covered by a plate K which extends above the top of the outer vessel J J'. The ore pulp is fed into the center of the apparatus through a conduit L and the frothing agent or agents are also fed into the center of the apparatus. When the agitator is rotated a violent agitation and aeration is set up within the grating K, but outside the grating the surface of the liquid in the outer vessel J J' is practically still so that the aerated pulp is ejected through the orifices H' in the grating and the froth forms at the water surface between the grating and the outer vessel, and the froth overflows in the launder $J^2$.

If the liquid (such as an ore pulp) contains an air emulsifying agent (such as eucalyptus oil) it is found that the air is emulsified in the liquid with extraordinary rapidity and efficiency so that this invention affords an economy in the agents necessary in processes such as the agitation-froth process.

The agitation and aeration produced by apparatus according to this invention is found to be so peculiarly suitable and efficient in the treatment of the ore pulp by processes such as, for example the agitation froth process, that it not only readily admits of a large increase in the percentage of solids which may be present in pulp to be treated, thereby increasing the quantity of ore that can be treated in a given plant and in a given time; but it also permits a much more dilute pulp to be successfully treated for the recovery of values—such as for example from a very fine ore slime carrying metal values suspended in a large quantity of liquid—especially where settlement or thickening of such dilute pulp is difficult to effect.

The efficiency of the agitation and aeration produced by this apparatus is so great as to enable great reduction in the power consumption of the agitation and aeration devices employed in the agitation-froth process of ore concentration for example.

The method of constructing the apparatus may be varied without departing from this invention as for example the blades of the agitator may be varied in shape and in curvature. Thus, they may be made thicker at those places where wear is likely to take place.

What I claim as my invention and desire to secure by Letters Patent is:—

1. In an apparatus for agitating and aerating liquids or pulps, the combination with a vessel having internal vertical faces, of a rotating agitator arranged to rotate about a vertical axis in the vessel and comprising a number of substantially radial vertical blades curved horizontally and a circular horizontal plate transverse to the blades, whereby the liquid between the blades is ejected horizontally with such force and produces such a degree of convection that the gas above the liquid is effectively drawn into the liquid and disseminated through it in a finely divided state.

2. In an apparatus for agitating and aerating liquids or pulps, the combination with a vessel having internal vertical faces, of a rotating agitator arranged to rotate about a vertical axis in the vessel and comprising a number of substantially radial vertical blades which are curved horizontally but which do not extend inward to the axis and a circular horizontal plate transverse to the blades, whereby the liquid between the blades is ejected horizontally with such force and produces such a degree of convection that the gas above the liquid is effectively drawn into the liquid and disseminated through it in a finely divided state.

3. In an apparatus for agitating and aerating liquids or pulps, the combination with an outer containing vessel having flat sides, of a rotating agitator arranged to rotate about a vertical axis in the vessel and comprising a number of substantially radial vertical blades curved horizontally and a circular horizontal plate transverse to the blades, whereby the liquid between the blades is ejected horizontally with such force and produces such a degree of convection that the gas above the liquid is effectively drawn into the liquid and disseminated through it in a finely divided state.

4. In an apparatus for agitating and aerating liquids or pulps, the combination of a containing vessel, a centrifugal agitator therein rotatable about a vertical axis and comprising a number of substantially radial vertical blades curved horizontally and a circular horizontal plate transverse to the blades, and a number of substantially vertical baffles so fixed in the vessel that the flat faces thereof intercept or obstruct the rotary movement of the liquid.

5. In an apparatus for agitating and aerating liquids or pulps, the combination of a vessel, a centrifugal agitator rotatable about a vertical axis therein and comprising a number of substantially radial vertical blades curved horizontally and a circular horizontal plate transverse to the blades, and a grating within the vessel arranged to intercept or obstruct the rotary movement of the liquid, the vessel having an outlet opening across which the bars of the grating extend.

6. In an apparatus for agitating and aerating liquids or pulps, the combination of a vessel, a centrifugal agitator rotatable therein, and a grating within the vessel arranged to intercept or obstruct the rotary movement of the liquid, the vessel having an outlet opening across which the bars of the grating extend.

In testimony whereof I have signed my name to this specification in the presence of two subscribing witnesses.

ALLEN CRAWFORD HOWARD.

Witnesses.
    WILLIAM H. BALLANTYNE,
    PHILLIPS CRAWLEY.